US008559980B2

(12) United States Patent
Pujol

(10) Patent No.: US 8,559,980 B2
(45) Date of Patent: Oct. 15, 2013

(54) METHOD AND SYSTEM FOR INTEGRATED MESSAGING AND LOCATION SERVICES

(76) Inventor: John J. Pujol, Redondo Beach, CA (US)

( * ) Notice: Subject to any disclaimer, the term of this patent is extended or adjusted under 35 U.S.C. 154(b) by 0 days.

(21) Appl. No.: 13/225,260

(22) Filed: Sep. 2, 2011

(65) Prior Publication Data

US 2013/0059606 A1   Mar. 7, 2013

(51) Int. Cl.
*H04W 24/00*   (2009.01)
(52) U.S. Cl.
USPC ........................................ 455/456.3; 455/457
(58) Field of Classification Search
None
See application file for complete search history.

(56) References Cited

U.S. PATENT DOCUMENTS

| | | | |
|---|---|---|---|
| 6,553,236 B1 | 4/2003 | Dunko et al. | |
| 6,868,333 B2 | 3/2005 | Melen | |
| 7,437,444 B2 | 10/2008 | Houri | |
| 7,577,666 B2 | 8/2009 | Overton | |
| 7,720,037 B2 * | 5/2010 | Bill | 370/338 |
| 2001/0002822 A1 * | 6/2001 | Watters et al. | 342/357.1 |
| 2007/0015518 A1 | 1/2007 | Winter et al. | |
| 2008/0132243 A1 * | 6/2008 | Spalink et al. | 455/456.1 |
| 2008/0288355 A1 | 11/2008 | Rosen | |
| 2009/0233629 A1 | 9/2009 | Jayanthi | |
| 2009/0239467 A1 * | 9/2009 | Gulin et al. | 455/41.2 |
| 2012/0015673 A1 * | 1/2012 | Klassen et al. | 455/456.3 |
| 2012/0172062 A1 * | 7/2012 | Altman et al. | 455/457 |
| 2012/0201143 A1 * | 8/2012 | Schmidt et al. | 370/241 |
| 2012/0309460 A1 * | 12/2012 | Kim et al. | 455/564 |

FOREIGN PATENT DOCUMENTS

WO   WO2006005122   1/2006

* cited by examiner

*Primary Examiner* — German Viana Di Prisco
(74) *Attorney, Agent, or Firm* — Blakely, Sokoloff, Taylor & Zafman

(57) ABSTRACT

A method and system to integrate communication with location services. The method and system provide a mapping tool and discoverability tool whereby a user can define discoverability to other users of the system on a per group or per individual basis. The system enables users to coordinate activities with friends and groups and to easily communicate with friends, family and associates who happen to be nearby, where in the past these opportunities to meet and congregate would have been missed.

4 Claims, 10 Drawing Sheets

METHOD AND SYSTEM FOR INTEGRATED MESSAGING AND LOCATION SERVICES

FIELD OF THE INVENTION

The embodiments of the invention relate to a method and system for integrating social networking with location services through user devices. Specifically, the embodiments of the invention relate to the use of a client application and server system over a network to provide an integrated mapping and social networking interface for communicating, managing contacts and coordinating activities between group members that are geographically proximate to one another.

BACKGROUND

Communicating with family, friends, business contacts and social networking contacts can take a number of forms including text messaging, instant messaging, status updates, blogs and phone calls. The number of contacts that an individual may have can number in the hundreds or thousands. This makes it very difficult for the individual to keep up to date with the majority of his relationships. As a result, the individual's relatives, friends, business contacts and social networking contacts can be visiting the individual's home town, vacationing at the same location, or attending the same conference as the individual, but the individual will be unaware of these circumstances. An opportunity is thereby missed to meet with these friends, family and business or social contacts, despite the common use of social networking services by all parties, because the activities or status messages of each party did not reach the other in a timely manner or they were unnoticed amongst the numerous other status messages or similar communicated information.

Even those individuals who are aware of their proximity to their family, friends, business contacts or social networking contacts can have difficulty in coordinating activities and meeting with these proximate individuals. Location tracking services can enable an individual to locate some of their contacts, but then separate services must be used to contact them, which is inconvenient. Also these tracking services must be actively monitored by the individual and are limited to use with other individuals who are also actively using them or enabling them. These tracking services often utilize global positioning services in cellular phones, which can quickly drains the battery life of the phone. As a result many individuals do not leave the associated applications running on their devices, thereby undermining the utility of these tracking services due to their infrequent use and stale information.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
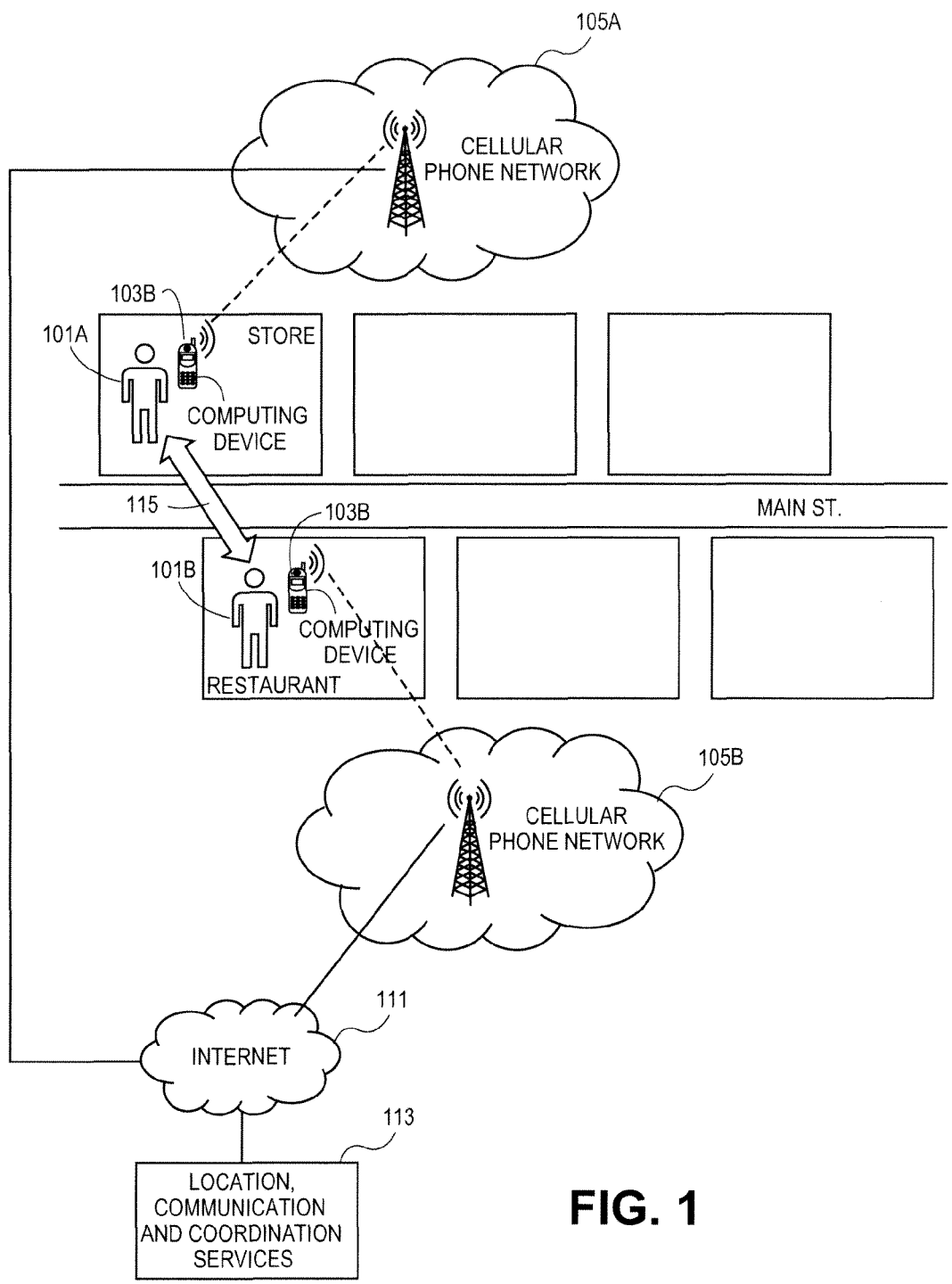
FIG. 1 is a diagram of one embodiment of a communication and coordination system for proximate users of the system.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., computers, servers, cellular phones, tablet computers, netbooks and similar devices.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory).

In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. The presentation of and interaction with user interfaces referred to herein as various types of 'interfaces,' can be enable by the electronic devices through the input/output devices discussed above.

Computing devices (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more server devices or server computers (e.g., server end stations), referred to herein generally as "servers," belonging to a service or content provider or server devices participating in a peer to peer service. The content provided by these servers can include public web pages (e.g., free content, store fronts, search services, etc.), private web pages (e.g., username/password accessed web pages providing email services, etc.), corporate networks over VPNs, IPTV, etc. Typically, computing devices are coupled (e.g., through customer premise equipment coupled to an access network (wired or wirelessly)) to edge network elements, which are coupled (e.g., through one or more core network elements (e.g., routers, switches and similar devices) to other edge network elements) to server devices (e.g., server end stations).

FIG. 1 is a diagram of one embodiment of a communication and coordination system for proximate users of the system. The diagram illustrates an example scenario where two individuals 101A, 101B are in proximity to one another. Each of the individuals possesses handheld computing devices, such as cellular phones, also referred to as 'smart phones,' with basic or advanced computing capabilities. The individuals 101A, 101B could be relatives, business associates, social networking contacts or have any other type of relationship. The individuals 101A, 101B can be connected to one another through their computing devices 103A, 103B and a communication network that enables data exchange between these two computing devices 103A, 103B.

The embodiments of the invention utilize the computing devices 103A, 103B to enable the individuals 101A, 101B to become aware of their mutual proximity and location of the other individual, to facilitate communication between the individuals 101A, 101B and optionally to facilitate coordination of their activities. In one embodiment, the computing devices 103A, 103B communicate with one another through at least one cellular phone network 105A, 105B. If the computing devices 103A, 103B are connected to separate cellular phone networks 105A, 105B, then these separate networks can communicate with one another through peering points, a connecting network (e.g., the Internet 111) or through similar communication systems.

In addition, the computing devices 103A, 103B can be in communication with a location, communication and coordination services server 113. The location, communication and coordination service server 113 can provide a set of location, communication and coordination services that notify each computing device 103A, 103B regarding the location of the other computing device 103A, 103B in coordination with profile and setting information that is maintained by the location, communication and coordination services system 113. Also, the location, communication and coordination services system 113 can facilitate communication between the computing devices 103A, 103B. Communication data can be forwarded or processed by the location, communication and coordination services system 113 including short message service (SMS) messages, instant messages, e-mail messages, telephone calls, voice over Internet Protocol (VOIP), web based messaging services (e.g., messaging provided by social networking websites, blogging websites and microblogging websites) and similar communication data.

In further embodiments, the computing devices 103A, 103B can utilize direct communication systems 115 to exchange data between the computing devices 103A, 103B. These direct communication systems 115 can include IEEE 802.11a/b/g/n based communications, Bluetooth, infrared (IR), radio frequency (RF) or similar communication protocols and systems. The computing devices 103A, 103B can use these direct communication systems 115 in place of or in combination with other communication systems such as the cellular communication systems 105A, 105B.

The computing devices 103A, 103B in combination with the communication systems 115, 105, 111 and the location, communication and coordination services 113 enable the two individuals using the computing devices 103A, 103B to manage the conditions and mechanisms through which they can be notified of the other individuals proximity and also the mechanisms through which they can communicate and coordinate their activities. The services, processes and structures involved in enabling this communication and coordination are described herein below in further detail.

The example of two individuals 101A, 101B and two computing devices 103A, 103B has been provided. However, one skilled in the art would understand that the processes and systems described herein also scale to facilitate communication and coordination amongst any number of individuals and computing devices. For example, a family of four can be shopping at a mall where each family member has their own computing device. Each of the four family members can determine the location of the other family members and communicate and coordinate with the other family members using the described processes and system. This location, communication and coordination can be strictly limited to the family by defining a group for the family and setting permissions and discoverability settings for the group through the respective computing devices 103A, 103B.

Figure 2:
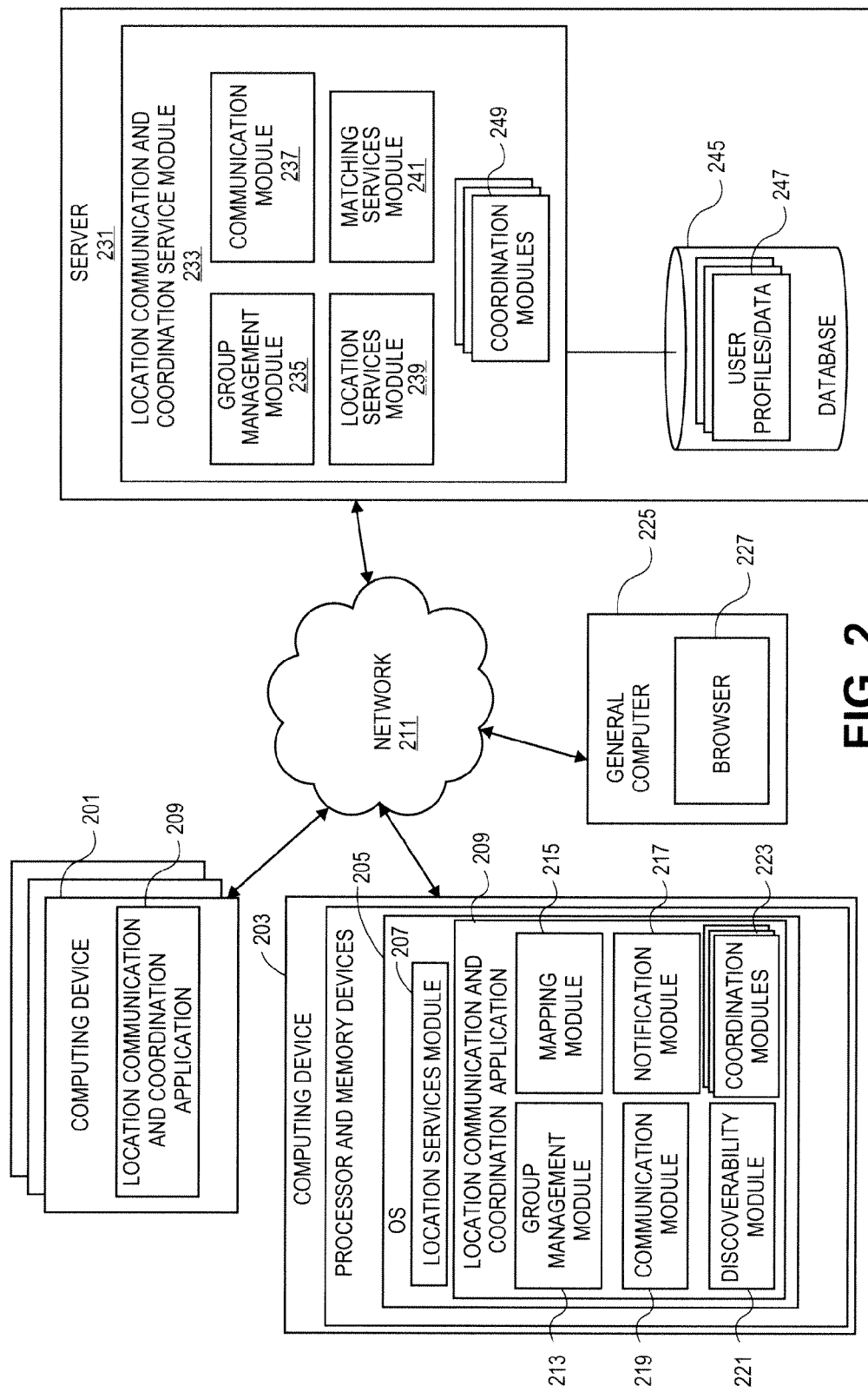
FIG. 2 is a diagram of one embodiment of an integrated location, communication and coordination services system.

FIG. 2 is a diagram of one embodiment of an integrated communication and locations services system. The diagram details the components of the location, communication and coordination server 231 and the connected computing devices 201, 203. The server 231 and computing devices 201, 203 can be in communication over a network 211. The network 211 can be any combination of wireless, wired, cellular, satellite and similar communication networks. The network 211 can also include public networks (e.g., the Internet) and closed or private networks.

The system can support any number of computing devices 201, 203 each executing a location, communication and coordination application 209 or a set of such applications. As used herein a 'set,' refers to any positive whole number of items including one item. Each computing device 201, 203 can execute a single location, communication and coordination application 209 or multiple instances the application 209. These location, communication and coordination applications 209 can communicate with one another or with the location, communication and coordination service module 233 provided by the server 231. The computing devices 201, 203 can be any type of computing devices including smart phones, tablet computers, net books, laptops, desktops and similar computing devices.

Each computing device 201, 203 can include a set of processors and memory devices that execute an operating system 203, location services module 207 and a location, communication and coordination application 209. The computing device 201, 203 can include any number of processors having any number of cores including general purpose processing devices such as central processing units as well as specialized processing devices such as graphics processing units. Any number and type of memory and storage devices can also be utilized in the computing device 203. The memory devices can include random access memory devices that are static devices, flash devices, dynamic devices and similar types of memory and storage devices.

The operating system 205 can be any type of operating system including ANDROID by Google, Inc., iOS by Apple, Inc., WINDOWS by Microsoft Corp., Linux, OS X by Apple, Inc. and similar operating systems. The operating system can be embedded or installed in the computing device 201, 203. The location services module 205 can be any combination of hardware and software components capable of determining a location and/or orientation for the computing device 201, 203. The locations services module 207 can include global positioning service (GPS) components, wireless (WiFi) network positioning systems including those based on near field communication systems (e.g., Bluetooth), cellular network positioning systems, gyroscopes and similar location and orientation determination equipment. The wireless network positioning system can determine a location of the computing device 201, 203 based on monitoring signal strength and triangulation of wireless signal sources. Similarly, cellular network positioning systems can determine a location of the computing device 201, 203 based on monitoring signal strength and triangulation of wireless signal sources. The wireless and cellular network positioning systems can also utilize known locations of detected signal sources to determine computing device location 201, 203. The operating system 205 and/or location, communication and coordination application 209 can manage the enabling and disabling of each type of location service provided by the location service module 207.

The location, communication and coordination application 209 can include a group management module 213, a mapping module 215, a communication module 219, a notification module 217, a set of coordination modules 223 and a discoverability module 221. In other embodiments, any combination of these modules can be independent of the location, communication and coordination application 209. In further embodiments, these modules can utilize or combine functions with other modules external to the location, communication and coordination module 209.

A mapping module 215 utilizes location information provided by location services module 205 and the location services 239 of the server 231 to plot and render a mapping interface where a user of the computing device 203 is displayed in a mapped location along with any other discoverable computing devices 201 within the boundaries of a map to be rendered. The mapping module 215 can also render location information, routes and similar information for a user of the computing device 203 to view and interact with. The mapping module 215 can function in coordination with the other modules of the location, communication and coordination application 209 to make available each modules functions through the map interface as described further in relation to each module.

A group management module 213 manages data tracking groups associated with a user of the computing device 203 and provides a user interface for updating and viewing this group data. A 'group,' as used herein, refers to any subset of users within a larger set of all users of the location, communication and coordination system. In one embodiment, a group can also be referred to as a 'pod.' Individual relationships between the user of the computing device 203 and other individual users of the location, communication and coordination system can be referred to as a 'coupling.' Couplings can be created by the user of the computing device 203 by inputting identification information (e.g., name, phone number, email address or similar information). In one embodiment, for a coupling to be completely formed the identified individual must accept the coupling from the creator of the coupling in which case the identified individual is notified of the proposed coupling and given an interface to accept, decline, ignore or similarly respond. Membership of a group or pod can be defined by the user of the computing device by identifying the couplings that will form the group or pod. These groups are defined by users of the system to represent real-world associations and relations. For example, a group can be defined to represent a family of an individual. Each family member can be listed as a member of this group. Similarly, groups can be defined for business colleagues, social networking associates and similar groupings of individuals. Each individual can create and control group memberships as well as a set of preferences related to each group membership. In one embodiment, couplings and groups are specific to the user of the computing device 203 and not shared or visible to other individuals. This enables each user to closely control the other users that they associate with, share messages with and are visible to independent of the group definitions and couplings of others.

In other embodiments, groups or coupling data are shared and jointly managed with other users, in these embodiments, the addition of other members to newly created or existing group can require confirmation or acceptance from each added member through an automated notification system. In shared or public coupling and group management, if two individuals create groups with similar or identical membership, then the overlap can be detected by the group management module 213 in coordination with the group management module 235 thereby automating the group member addition process for matching groups created by different users. In the independent group and coupling management system, any overlap in group membership is coincidental and does not affect the operation of the system.

In one embodiment, the 'coupling' represents the basic building block of relationship and group definitions. Groups or 'pods' are formed based on these couplings. Users can assemble groups of couplings in any number of permutations to form groups. Once a group is formed from at least one coupling, larger groups can be formed from adding additional couplings or other groups. Each coupling can be utilized in more than one group and can be severable from each group. These couplings when shared across devices can be separately managed on each device. The couplings provide a convenient and easily manipulable unit of group and relationship definition.

The preferences or settings for each group can include discoverability settings. The term 'discoverability,' as used herein, refers to the ability of other computing devices to obtain location information about the computing device of an individual. A user of the location, communication and coordination application 209 can configure discoverability settings on a per group, per individual, or per user basis. The user can be given any level of granularity in controlling the user's discoverability to others. The user can set discoverability as an on/off setting for each group to which the member belongs, for each other individual using the location, communication and coordination system, or as a general on/off setting for the user that enables or disables all users to be able to discover the user (i.e., a public/private typesetting). In addition to basic discoverability, ranges for discoverability, details of location information, frequency of location updates, dates and times of discoverability and similar settings can also be configured and stored for the user to enable the user of the location, communication and coordination application 209 to have control over the conditions under which the user can be discovered by other users. These discoverability settings can include a 'cloaked' or hidden setting for users to toggle or activate when they do not want to be located by other group members or only to be located under specific defined circumstances (e.g., close proximity). In one embodiment, the hidden or cloaked mode will not entirely eliminate the location visibility of a user, but will instead approximate or 'blur' the location of the user. In one embodiment, the location, communication and coordination application 209 can also support a 'hot locate' option, where a user can temporarily override other settings to obtain a higher level of location accuracy and to obtain updated group member locations.

A communication module 219 provides a mechanism and user interface for a user of the computing device 203 to communicate with other users of the location, communication and coordination system. The communication module 219 can be activated through the mapping interface provided by the mapping module 215 or similarly activated. The user interface provided by the communication module 219 can be separate from the mapping interface or embedded within the mapping interface. The communication module 219 can communicate with other communication modules of other computing devices 201 either directly or through the communication module 237 of the server 231 or other intermediate services. The communication protocol can be an instant message protocol, an SMS message, web based messaging, a protocol specific to the location, communication and coordination service, e-mail or any combination thereof. The data shared with other computing devices 201 can be direct messages, status messages or similar information.

The communication module 219 also manages incoming communications from other computing devices 201. These incoming messages can be grouped by associated user and made viewable in dedicated screens with logs of the incoming messages. The incoming messages, such as text messages and status messages can also be displayed through a user selected icon or avatar that is displayed through the map interface of the mapping module 215. The incoming messages can be received from the communication modules of other computing devices or through the location, communication and coordination server 231. The incoming messages can also include user data such as an avatar, icon and/or profile of the originator of the message. This information can be displayed or similarly made accessible to the user of the computing device 203.

In one embodiment, the communication module 219 functions can be activated by selecting an avatar or icon of another user through the map interface. The functions activated can include opening a user interface to initiate message composition that is directed to the user selected. For example, a selected user avatar can be changed into a text input field that allows the user to send an SMS message to the computing device of the selected user. Similarly, incoming message data can be provided to the mapping module 215 such that it can be displayed with the avatar or icon of an associated user. In other embodiments, selection of an avatar or icon in the map interface can open a separate message composition window for e-mails and longer forms of messages.

A notification module 217 manages communication with the matching services 241 provided by the location, communication and coordination services 233 of the server 231. The notification module 217 receives messages through the communication module 219 from the server 231 indicating that a computing device 201 with enabled discoverability is within a defined range of the computing device 203 of the user. The notification message can include the user data of the discoverable user. In one embodiment, only those computing devices 201 that are tied to a user that is discoverable and within a group shared with the user of the computing device 203 generate notifications. In another embodiment, in addition to users in shared groups, profile matches can generate proximity notifications. The notification module 219 can alert the user of the computing device 203 by generating an audio and/or visual alert through the speaker or display of the computing device 203. Any output mechanism of the computing device 203 can be utilized to generate an alert to the user including haptic feedback, audio feedback, visual feedback and similar types of alerts. A detailed notification can be made available through any of the user interfaces of the location, communication and coordination application 207. The detailed notification can include name, shared group, contact information such as phone numbers and similar information. The notification can also provide a link to or be embedded within the map interface.

A discoverability module 221 manages discoverability settings for the user of the computing device 203. The discoverability module 221 provides an interface through which the user can set discoverability options (e.g., on/off, range, etc.) for each group or individual that is coupled with the user. The discoverability module 221 also provides this information to matching services 241 of the location, communication and coordination services 233. This discoverability data can then be used by the matching services 241 to screen out users who are in proximity to one another, but whose discoverability settings prohibit notification. In other embodiments, the discoverability module 221 can exchange discoverability information directly with other computing devices 201 that are in range of communication. The discoverability module 221 can then directly screen out other computing devices set to not be discoverable. Conversely, where direct communication computing devices 201 are configured to be discoverable, the discoverability module 221 can negotiate the exchange of user data based on the user settings that can limit the amount of data shared with other users with any level of granularity.

A location, communication and coordination module 209 can also include a set of coordination modules 223. These coordination modules 223 can provide a set of ancillary services to a user to help the user of the computing device 203 coordinate activities with the users of other proximate or remote computing devices 201. Any number and combination of coordination services can be offered and each service can be offered as being integrated with the user interfaces of the other modules such as the mapping interface or can offer a separate window or user interface.

A coordination module 223 can offer a directions service that enables the plotting of directions to another computing device 201 through the mapping interface. A coordination module 223 can search nearby locations for suitable meeting spots based on user preferences, keywords or similar input. A coordination module 223 can offer information about local events or attractions that can be shared between computing device 201, 203 to enable the users to meet at or participate in the same events. For example, event schedules for conferences, open seats at theaters, movie showtimes and ticket information can be shared between users through their respective computing devices 201, 203 using a coordination module 223. A coordination module 223 can also enable file sharing between computing devices 201, 203 including documents, photos, videos and similar files.

In one embodiment, the coordination module 223 can determine a location roughly equidistant to two computing devices 201, 203 to enable the users to easily meet. This equidistant location can be determined based on mode or recent rate of travel of each computing device 201, 203. For example, one user may be walking while the other is driving or when both are driving traffic conditions can be analyzed in determining a meeting location that will take a roughly equivalent amount of time for each user to reach. Each user can specify location types (e.g., restaurants including particular types of restaurants, coffee shops, parks and similar locations) that are suitable and regions or districts (e.g., downtown, shopping district, neighborhood and similar areas) that are preferred for meeting places. Notifications or advertisements from merchants, event promoters, interest groups or similar entities can also be provided to users to inform them of suitable meeting places and potential deals associated with these meeting places. This can be a configurable option for each user. For example, a user can subscribe to interest groups or may be a member of a group associated with an interest group, such as environmental action groups, political groups, religious groups, hobby groups and similar groups. In one embodiment, a user can opt to receive local broadcast notifications related to local events or events that correlated with defined interests.

In one embodiment, a location, communication and coordination server 231 can host a set of services through a location, communication and coordination service module 233. The service module 233 can be an application or set of applications to support the functions of a set of location, communication and coordination applications 209 and computing devices 201, 203. The example of a single server 231 is provided, however, one skilled in the art would understand that these functions and services could be distributed over any number of separate server machines. The server 231 can also store databases of user data and profiles 245 in a database 247. The database 247 can also be distributed over multiple machines.

The location, communication and coordination service module 233 can host a group management module 235, a communication module 237, a location services module 239, a matching services module 241 and a set of coordinating modules 249. The group management module 235 can track and store group membership data for each user of the system. A user can define any number or combination of groups. Groups can have any number of members and can be divided and sub-divided. Group management can be user specific or jointly controlled by sets of users that are members of the group. The update and permission management for managing the groups is maintained by the group management module 235. The group management module 235 communicates with group management modules of the computing devices 201, 203 where each user can manage his own individually defined group memberships and the membership of any shared groups for which he has permission to alter membership lists. Users can also have other types of one to one relationships or basic friends lists which can also be tracked by the group management module 235 or a similar module.

In one embodiment, the group management module 235 can also interface with other third part services to import membership information for that third party service. Any number of third party services can be interfaced with the location, communication and coordination service 233. The group and membership information can be imported and made available to any user of the system. Similarly, the group management module 235 can also export or synchronize group and membership data with third party services based on changes made by users through the location, communication and coordination services. In other embodiments, the third party services such as matching services can work in conjunction with the location, communication and coordination services to identify user matches according to their own criteria or provide other similar services, the result of which are provided to the location, communication and coordination service. The results can be utilized to generate proximity notifications or to take similar actions. Similarly, the location data and other data collected by the location, communication and coordination service can share any amount data collected including user profile data and location data to third parties to enable enhanced functionality such as enhanced matching functionality. For example, user profile and location information can be provided to external matching services to enable these services to update matching services based on location proximity and similar information otherwise unavailable to these external services. The type and amount of data shared can be controlled by each user.

A communication module 237 can manage the exchange of messages and user profiles and data between the server 231 and the computing devices 201, 203. The communication module 237 can also manage the exchange of messages between computing devices 201, 203. The communication module 237 can track the current networking address information of each computing device 201, 203 to enable the necessary exchange of information needed by the other modules of the system.

The location services module 239 receives and stores location information for each connected computing devices 201, 203. This location information can be in any detail and with any type of coordinate or location system. The location information can be used by other modules to enable matching, notification, coordination and similar functions and services provided by the system. Location information can be time stamped to track which data is current and which information is stale. In some embodiments, the location services module 239 can also compute a location of connected computing devices 201, 203 based on provided location information to minimize the amount of computing resources that the computing devices 201, 203 must dedicate to determining their location for the different types of location and orientation detection systems.

A matching service module 241 monitors location information and user profile data and settings to identify when group members are in proximity to one another such that a notice to each computing device 201, 203 should be generated. The matching service module 241 can use user profile data to identify the discoverable users as well as the constraints on the discoverability. The location information is then sorted for each discoverable user to determine which sets of users meet the requisite criteria that each has set for notification. If a set of users is identified then a notification message or set of notification messages are generated and forwarded to the communication module 237 to be sent to the corresponding computing devices 201, 203. In one embodiment, the matching service module 241 can work in coordination with external matching services as described herein above. In addition to user profile information, the matching service module 241 can perform matching services based on other collected data such as questionnaires completed by users and similar user created or collected data. This data can be collected at any time and utilized over any time period based on user defined preferences. For example, a host of a party or conference can generate a questionnaire to distribute to a group of user attending the event. The responses can be used for match making as a networking tool or 'icebreaker.'

In some embodiments, the matching is not restricted to group membership, including direct relationships and friends lists, but can also encompass profile matching between unacquainted individuals. Discoverability for this type of match can be specifically configured by each user. This matching function allows notifications to be generated based on any defined commonality between user profile data. The commonalities can be pre-defined and selected by a set of users or can be user defined. The amount of shared user information can be minimized in these types of matches to preserve security and privacy for the users who opt to allow this type of matching. For example, exact location information may not be provided via an avatar on a map or similar indication. Instead, the users can be notified of general proximity by message or alert. The users can then determine whether they want to provide additional and more specific location information. The profile matching can be based on any tracked information about users.

Coordination modules 249 can be executed by the server 231 or by a separate server including a third party server to enable functionality of corresponding coordination modules 223 on the computing devices 201, 203. These coordination modules can facilitate communication of information between coordination modules 223 of different computing devices 201, 203 or can provide additional resources to the coordination modules 223 not available on the computing devices 201, 203. For example, for event sharing or coordination, a coordinating module 249 can provide location proximate information (e.g., nearby events, attractions, restaurants, shops, movies, shows, etc.) from a large database of such information.

The database 245 can be any type of database system including object-oriented database systems, relational database systems and similar database systems. User profiles 247 can include any amount of data about each user including name, interests, group memberships, friends lists, activities, third party services, authentication information, discoverability preferences, computing device type and resources and similar information.

In one embodiment, user profiles 247 can include additional information collected from users including through questionnaires, purchase histories, location histories and similar data collection. The collected data can also be defined and shared by users including user defined interests, fan clubs, groups, group memberships and similar data. The use of this data for matching can also be user defined and modified. Users can define weights for matching characteristics, exclusions, requirements and any combination thereof. Users can define and share questionnaires and similar mechanisms for data collection and matching. Groups and advertisers can also generate data collection vehicles and matching mechanisms. For example, a high school class group member could generate and share a questionnaire with other group members. Each group member could log into a group based blog or web interface to answer the questionnaire. The access can be passcode or similarly protected. The results of the questionnaire can be used to notify group members with common interests or when in proximity to one another. Users can also generate their own match criteria or queries to obtain user matches from a database of questionnaire or other collected data to mine for shared interests or other commonalities.

Figure 3:
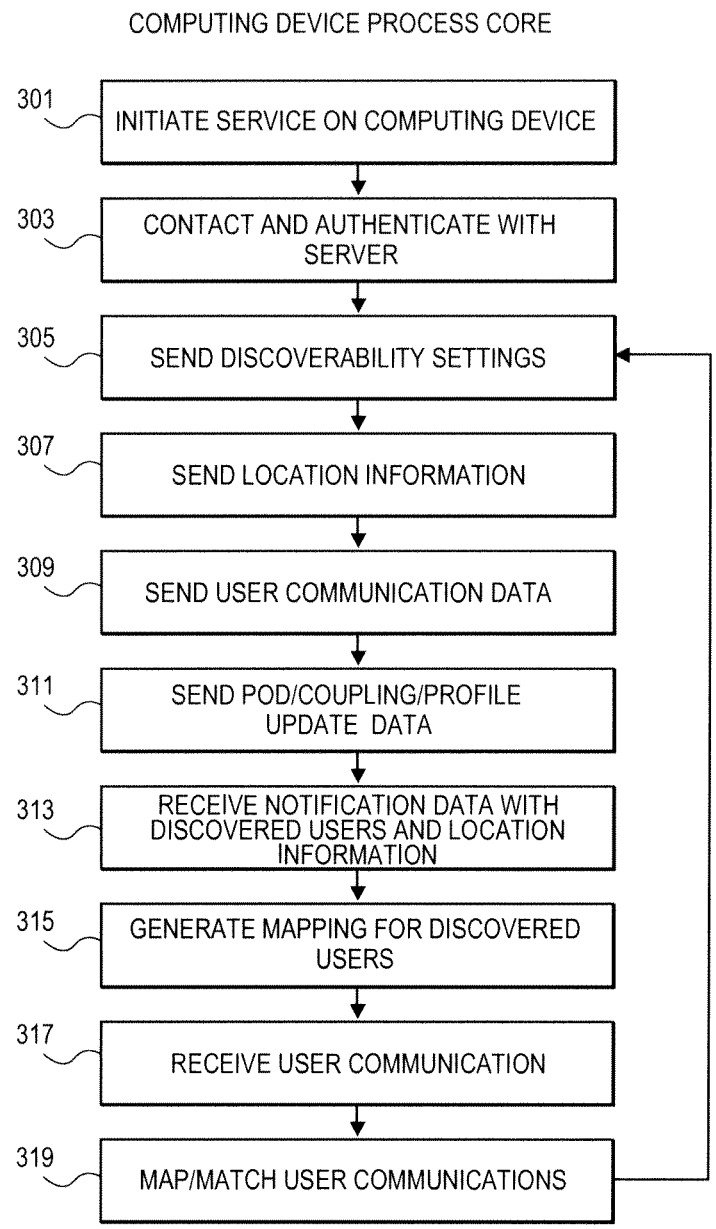
FIG. 3 is a flowchart of one embodiment of a process for a computing device providing the location, communication and coordination service.

FIG. 3 is a flowchart of one embodiment of a process for a computing device. The core processes of the computing device are initiated on a computing device upon start-up of the device or in response to a user activating the location, communication and coordination application on the computing device (Block 301). The order of the following actions by the location, communication and coordination application is presented by way of example. Other sequences of these actions can be utilized and the parallel execution of any or all of the actions is also possible.

The application can contact the location, communication and coordination server and authenticate with the server (Block 303). Authentication can require a user to input a user name, cell phone number, password and/or other authenticating information. Users can be authenticated using other information such as credit card numbers and similar information. The server then returns an acknowledgement of the authentication to enable the use of the services at the server.

The application can send the discoverability settings to the server (Block 305). The various settings and data to be provided by the application to the server can be unchanged since a previous connection to the server, in which case, an indicator of this information can be sent. Similarly, changes in information can be sent without having to resend all data that had previously been sent to the server. The discoverability settings will be used by the server to ensure that only specified groups or users will be able to obtain user profile and location information.

The application can then send the location information (Block 307). The location information can provide any level of detail about the location of the computing device that can be obtained by using the location services currently enabled on the computing device. Any unsent user communication data can be sent to the communication module of the server to be forwarded to the appropriate destination (Block 309). User profile data and user membership data can be sent separate from or in combination with communication data (Block 311). The location information and user profile data are sent to the server to update the records of the server and to ensure that the matching process of the server uses accurate and up to date information. The matching module will then analyze the remaining data to identify matches and generate notifications thereof. If any matches are determined at the server, then a notification message is received with information about the users who were matched based on the notification preferences of each matching party.

Incoming notifications can also include the location information for a computing device of a matching user. This location information can then be utilized to map the location of the matching individuals (Block 315). Communication messages from these matched users can be received at any time (Block 317). These received communication messages such as text messages or status updates can then be displayed through the map interface when open along with or embedded within an avatar or icon of the sender of the message (Block 319).

This core process is provided by way of example and one skilled in the art would understand that alternate sequences can be used and that the core process can be continually run to periodically or continuously update location information, communication information, and user profile data. This process is implemented in the components of the location, communication and coordination application on computing devices.

Figure 4:
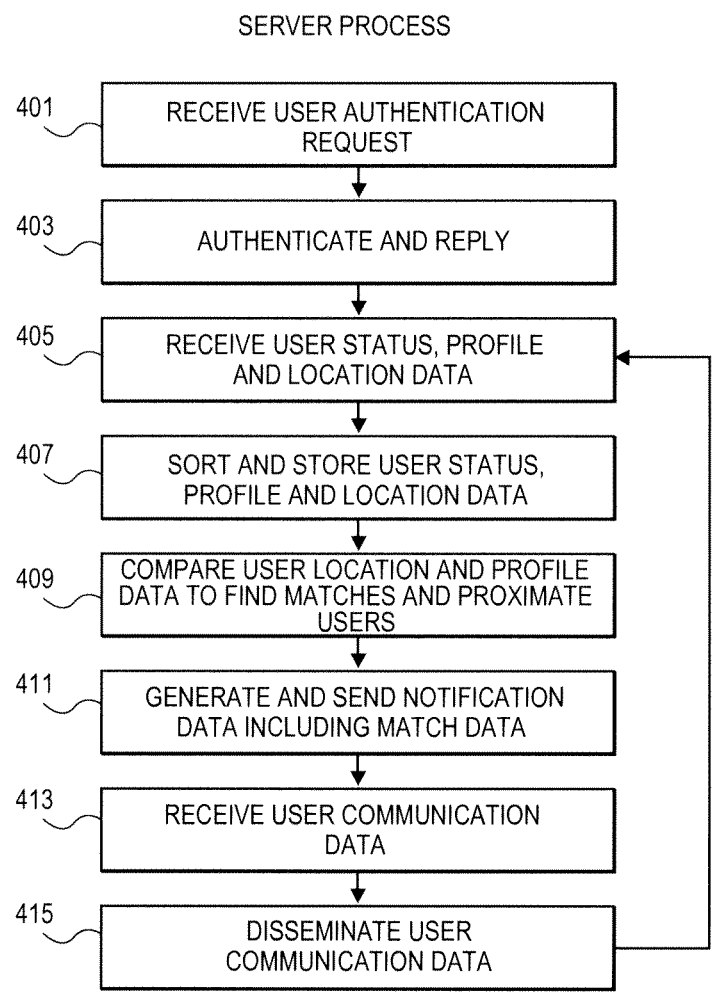
FIG. 4 is a flowchart of one embodiment of a process for a server providing the location, communication and coordination service.

FIG. 4 is a flowchart of one embodiment of a process for a location, communication and coordination server. The server is responsive to communication of data from any of the connected computing devices. The computing devices, specifically the location, communication and coordination applications, can initiate communication with the server by making a user authentication request (Block 401). The server can authenticate the received request before allowing access to the services of the server and sending a reply indicated whether the services are available and the authentication is successful (Block 403).

Each connected computing device will periodically or continuously send user stats data, profile data and location information (Block 405). This data contains all changes in user status, profile data or location information since the last communication that was sent by the computing device (Block 407). This data is then sorted and stored into the appropriate user profiles and location information databases (Block 409).

The stored data can be processed by the matching service module to identify other users with shared group membership (in embodiments where there is shared or joint group data) or similar defined relationships where both have discoverability requirements that have been met in terms of proximity and similar criteria (Block 409). If any matching users are found where the discoverability requirements are met and the profile information indicates share group membership or similar defined relationship, then a notification message is generated and sent to each user (Block 411). In one embodiment, the detail of the user information sent in each message is also determined by user preferences. The user preferences can be applied separately or jointly for each user in a set of matching users. For example, if five friends are discovered proximate to one another, then the settings of the friend with the most restrictive limitations on information sharing can govern the amount of information shared with all of the friends.

The server can also periodically receive user communications destined for the computing devices of other users (Block 413). The location data or similar data can then be utilized to route the incoming message to the computing device of the intended recipient of the message (Block 415). In some embodiments, a message can be intended for more than one individual and the communication module of the server can copy the message and forward it to each of the intended recipients. User preferences can also limit communication by protocol, message type, sender identification, time and date and similar restrictions.

Figure 5:
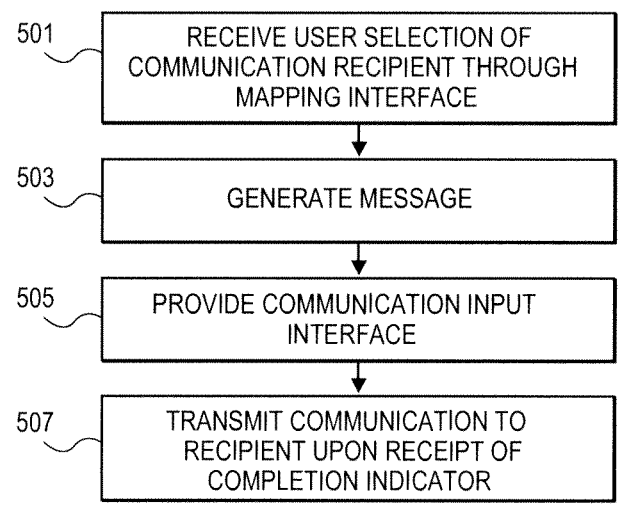
FIG. 5 is a flowchart of one embodiment of a communication process for a computing device.

FIG. 5 is a flowchart of one embodiment of a communication process for a computing device. Communication from a computing device using the location, communication and coordination application is user initiated and asynchronous with the core process described herein above. A user can initiate the composition of a message to another user by selecting the avatar or icon of the user to whom the message is to be sent (Block 501). The avatar or icon can be selected through a mapping interface or through a listing or similar interface. Based on the selection of the avatar or icon of a user a message is generated with the destination address information determined based on the selected avatar and user information obtained from the server (Block 503). A group message can also be initiated by selecting multiple avatars or icons on the mapping interface. In one embodiment, the user interface forms the temporary group based on the user selection in response to a rapid or quick sequence of touching the avatars or icons of more than one contact, i.e. a 'rapid tap interface.' This enables quick and easy on the fly creation of group messages. A user can be prompted or similarly allowed to store the selected group for future use. In shared group data embodiments, the newly created group can be shared with recipients of the group message to facilitate quick replies. In another embodiment, all messages are sent to the server to be matched with destination address information based on an identifier linked with the selected avatar or icon.

A communication input interface is provided by the application for the user to input a message such as text or to attach a file or similar data (Block 505). The communication input interface can be a dedicated window or screen or can be an input window or field embedded in another interface such as the mapping interface. Once the message is complete the user can select a send option to start the transmission of the message to the recipient (Block 507).

Figure 6:
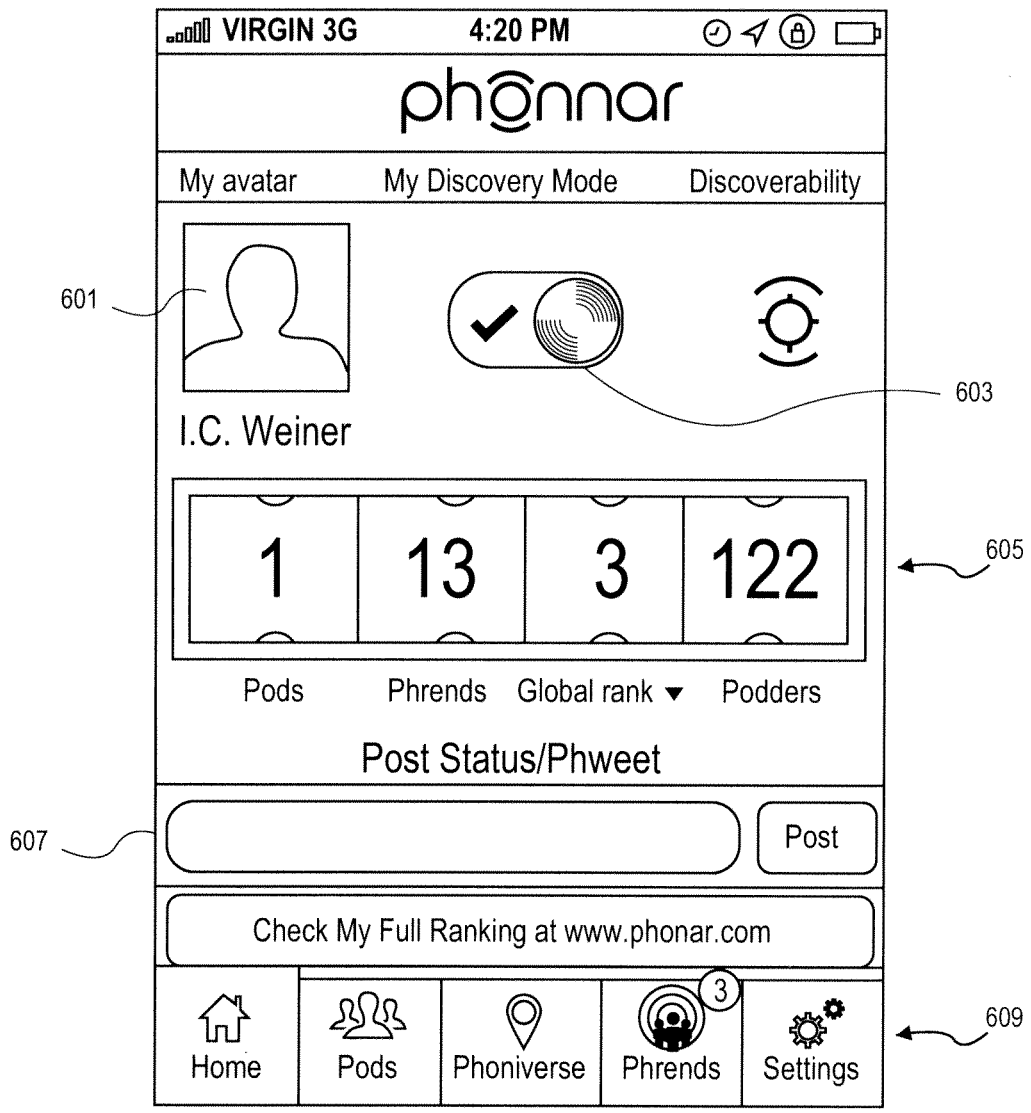
FIG. 6 is a diagram of one embodiment of a user interface of the location, communication and coordination system for a computing device.

FIG. 6 is a diagram of one embodiment of a user interface for a computing device. The example user interface integrates several different aspects of the location, communication and coordination application related to configuration. The user interface displays a current avatar 601 for the user. The avatar 601 can be selected by a user to initiate a process of changing the current avatar 601. A discoverability interface 603 displays the current general discoverability status of the user and allows that status to be changed by interacting with the interface (e.g., sliding a slider to another position). A user statistics interface 605 displays some current statistics related to the current user. In the example, the user statistic interface 605 shows the number of groups (pods), friends (phrends), a ranking and a group member ship count (podders). Any type of statistics or other types of user profile data can be maintained by the system and displayed to the user. Additional types of user statistics can be selected or cycled through by interaction with the user statistic interface 605, for example, by pressing any of the displayed fields or field titles. A chevron or similar indicator adjacent a field or field title can indicate additional selectable alternatives or filters. For example, the global rank field could be cycled or changed to school, class, phrends, country, state or similar ranking group.

A communication interface 607 is presented that allows a user to update a status for that user. This status is transmitted to the server for dissemination to other group members and friends when the user is in the discoverable mode. Additional navigation options are presented in the navigation bar 609. The navigation bar 609 is presented by way of example and other means of navigating the menus and interfaces of the application can be utilized. The layout of the user interface is provided by way of example and fitted for a touchscreen or other smart phone display. One skilled in the art would understand that alterations and variations of the layout would be utilized for other types of devices such as tablets or net books.

Figure 7:
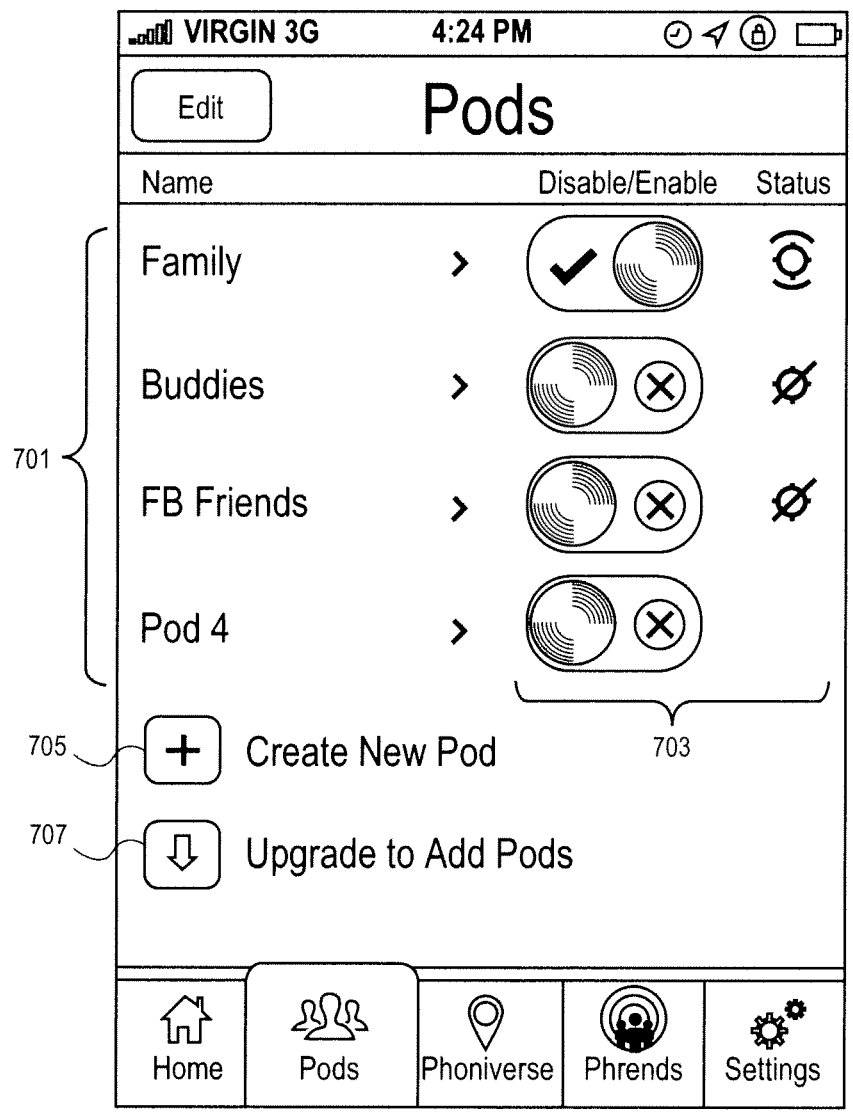
FIG. 7 is a diagram of one embodiment of a user interface for group management on a computing device.

FIG. 7 is a diagram of one embodiment of a user interface for group management on a computing device. The 'pods' tab in the example user interface shows all of the groups that a user has define or to which the user belongs 701. An interface 703 for managing discoverability on a per group basis is provided. In addition, user interface elements are provided for creating or defining new groups and adding support for more groups. In one embodiment, a user can be restricted to a specific number of groups. This enables the developer to charge users for this added functionality.

In other embodiments such as the shared group data embodiments, the user can also manage member requests from other users in groups that the user controls. In the example, discoverability is presented as a simple on/off switch. However, as mentioned above, discoverabilty can be managed at any level of granularity including a simple on/off switch and highly complex definitions and logic (e.g., Boolean logic) can be used. Additional information about the groups including the number of members can be presented. Also, specific members can also be displayed to enable selection of a specific subset of a group for a separate set of requirements.

Figure 8:
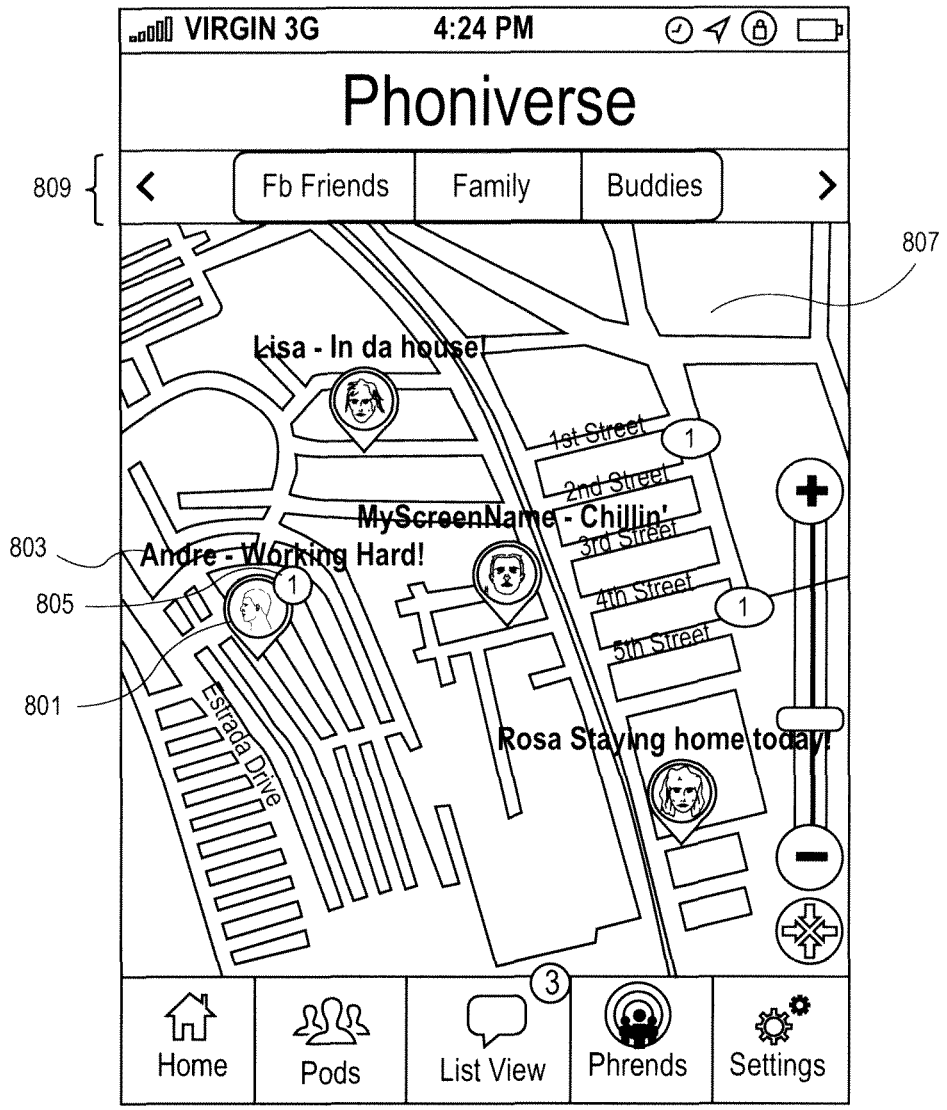
FIG. 8 is a diagram of one embodiment of a user interface for a location service on the computing device.

FIG. 8 is a diagram of one embodiment of a user interface for a location service on the computing device. This embodiment illustrates the mapping interface. Each of the discoverable users 801 with proximity requirements that have been met are displayed on the map 807 along with the avatar of the user. A set of additional filters 809 can also be toggled to further refine or restrict the number and type of users that are displayed on the map. The avatars can be accompanied by or modified to include identifier and status information 803 and message or inbox information 805.

The identifier and status line 803 can be separate from or embedded into the avatar of the associated user. The size and characteristics of this display of information can be configured by the user. The message or inbox indicator 805 can signal when a message or notification related to the user of the avatar has been received or is awaiting viewing. This can be a number of the received messages or a symbol representing the type of messages.

Figure 9:
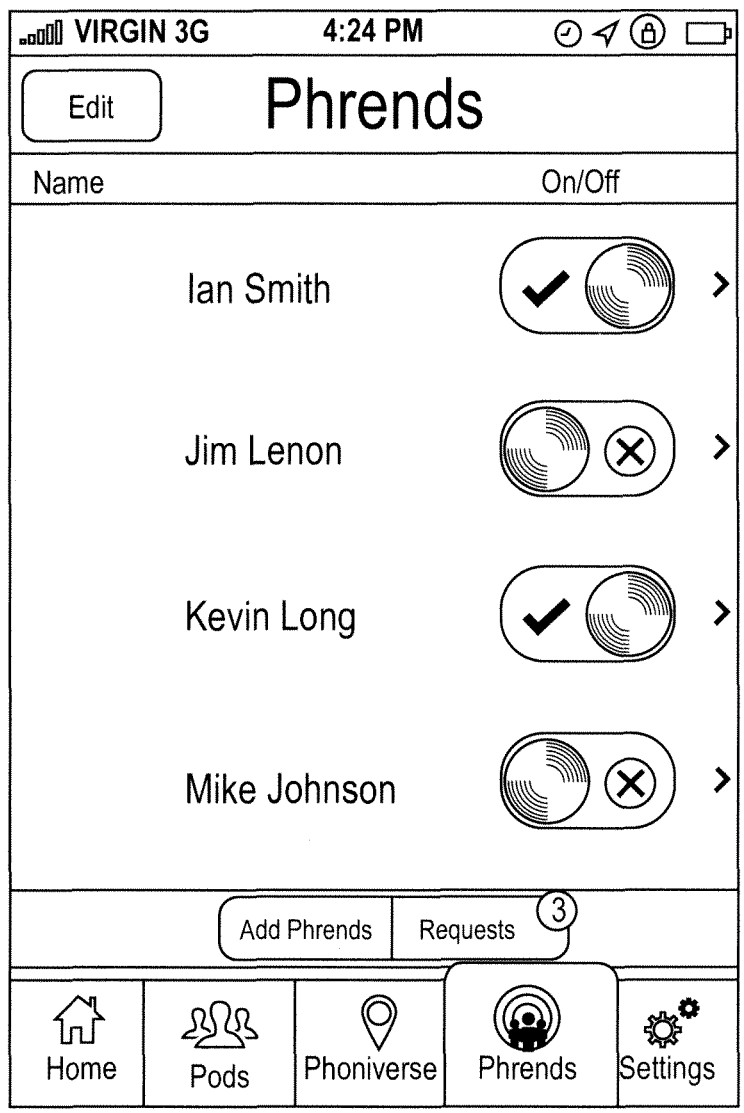
FIG. 9 is a diagram of one embodiment of a user interface for friend discoverability management.

FIG. 9 is a diagram of one embodiment of a user interface for a friend visibility management. In some embodiments, a friends list specific to the location, communication and coordination service can be maintained that is separate from other services and that is separate from group management. Discoverability can be then determined on a per individual basis overriding any shared group membership. These friends can also be imported or shared with other third party services. A user can also review incoming friend requests from this service or third party services.

Figure 10:
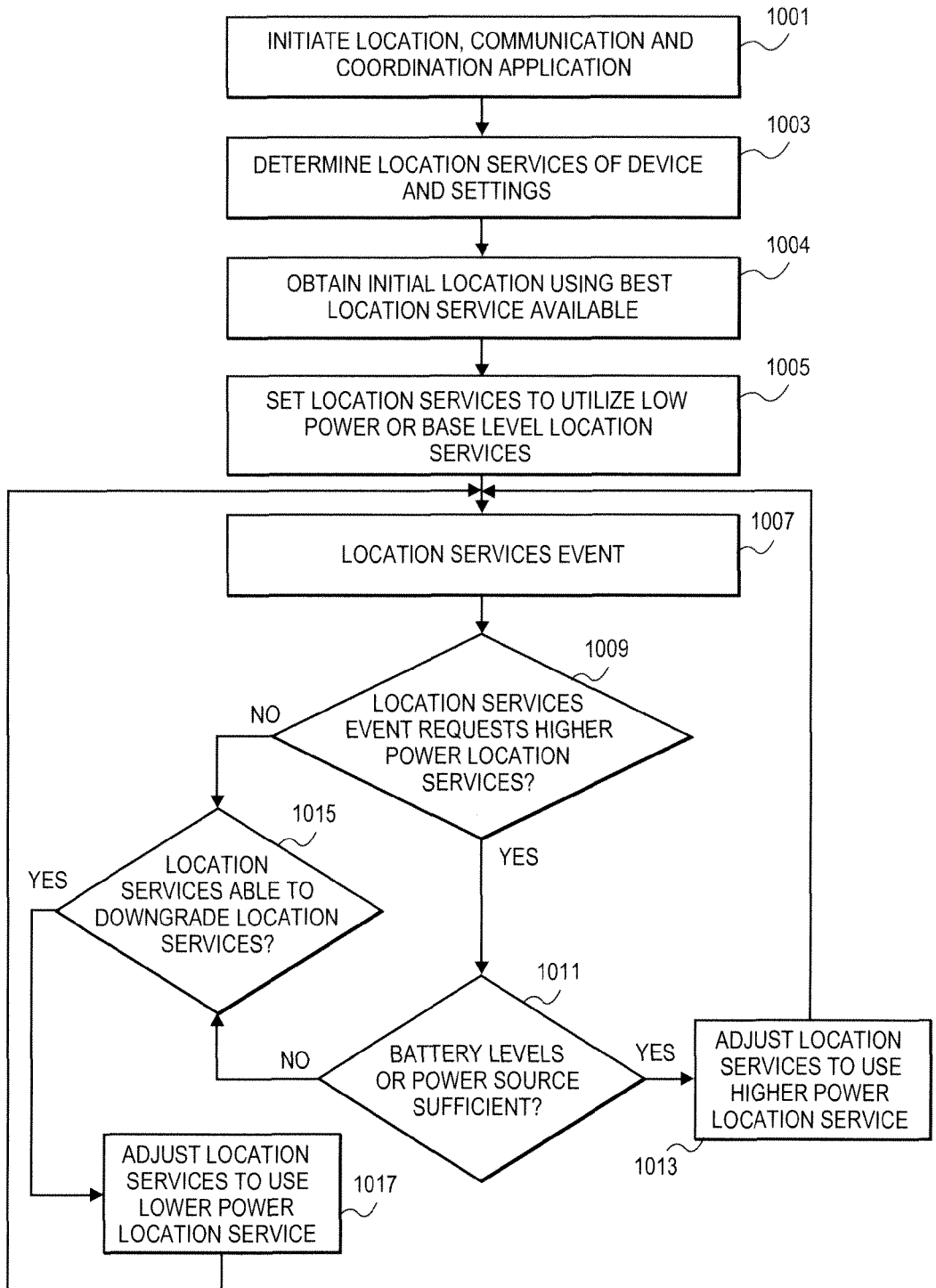
FIG. 10 is a diagram of one embodiment of a process for power management for a location, communication and coordination system.

FIG. 10 is a diagram of one embodiment of a process for power management. In one embodiment, the system includes a power management feature in the location services module of the computing devices. This process minimizes the power consumed by the location services of the computing device. In many types of computing devices, location services can significantly impact the battery life of the computing device, making the continuous use of the location services undesirable. Minimizing the power consumed by the location services improves the usability of the location, communication and coordination system.

The power saving process is initiated with the start-up of the location, communication and coordination system (Block 1001). The process determines a set of possible location services available in the computing device and a set of settings for use of the location services defined by the user (Block 1003). In computing devices that have multiple location services, this process can optimize the use of the available services.

Once the available services are determined, the highest level or most accurate location service is enabled to obtain an initial location for the computing device (Block 1004). After the initial location is determined, the lowest power location service or a default 'base' level of location service is initially selected to be utilized to identify the location of the computing device (Block 1005). Often, GPS services are the most power consumptive location services, while other services such as cellular network based or wireless network based location services are more energy efficient. The base level of the location services can be set by a user through a configuration menu using a user interface mechanism such as a slider to adjust the desired base level of location services. In another embodiment, the power services can be cascaded down to the base level location service to provide a more gradual transition after the initial location is determined.

The process continues to utilize the lowest energy consuming location service or base level location service of the computing device until a location service event occurs (Block 1007). The event can be a periodic check, a change in location services usage or similar occurrence. If there is a change in the location service usage such as the use of a coordinating module that requires more accurate or wider range location services, then the selected location service can be modified to the least energy consuming services that is capable of servicing the needs of the coordinating module or similar service. This process can be further divided into a check as to the level or type of location services needed and a check of the current battery levels of the computing device.

In one embodiment, a location services event can be triggered by device movement. For example, if the device is detected as moving more than a defined distance or is traveling at more than a defined rate, then the location service event can be triggered to raise the location service level to maintain an accurate location depending on the distance moved and rate of movement. A location service event can be a timed event with any defined time range, whereby after the defined time range has expired, then the location service level is raised to obtain a more accurate location thereby proving at least a periodically accurate location. A location service event can be triggered in relation to a change in the efficacy of a location service level. For example, if the current location service level is GPS or WiFi, but the signals are lost, a transition to another location service level can be made and those location service levels that are non functional can be removed from consideration as a current service level. A location service event can be initiated by a direct user input, such as an input correlated with a 'hot locate' action whereby the user indicates that an accurate location is to be obtained. The 'hot locate' and similar service events can also have a defined duration and can define a sequence of service levels. For example, the hot locate function can temporarily cause the service level to be raised to a high or the highest level to accurately determine the location of the computing device. The function then proceeds to return the service level to the previous service level setting rather than to progressively step down to lower service levels. Each phase of this function can be implemented using separate location service event or can be similarly implemented.

If higher powered location services are not needed (Block 1009), then a check can be made to determine whether a lower powered location service can be used (Block 1015). If a lower powered location service can be utilized, then the system is set to use this lowered powered service (Block 1017). However, if a lower powered location service cannot be utilized the process continues until another event that triggers re-evaluation of the selected location service. If a higher powered location service is needed (Block 1009), then a check is made of the battery life of the device (Block 1015). If the battery level is not sufficient, then a check for a lower powered location service can be made. If a higher powered location service is needed and the battery level is sufficient to execute it for a designated period of time, then the currently selected location service is updated to utilize the higher powered location service (Block 1013). In a further embodiment, if the computing device has available an external power supply, then the user can be prompted to switch to a consistent location service level such as the highest or most accurate location service level. When the external power supply is removed, then the process can return to a base location service level or return to the power management process in any other state.

In one embodiment, the system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the computer-readable medium include a read only memory (ROM), a floppy diskette, a CD Rom, a DVD, a flash memory (e.g., a Secure Digital (SD) card or similar device), a hard drive, an optical disc or similar medium.

Thus, a method, system and apparatus for efficient way to integrate communication and locations services across a network have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
sending location information of a user to a server;
receiving notification information including a location of an individual and communication information from the individual, wherein receiving the notification information is for individuals in proximity to the user;
mapping the location of the individual using a representation of the individual in the form of an avatar sent by the individual, the representation integrated with the communication information from the individual;
receiving a user selection of a representation of the individual through a map interface of a computing device;
providing a communication interface by the computing device to the user in response to the user selection;
transmitting a communication by the computing device to the individual;
tracking mutually accepted discoverability as a coupling between the individual and the user in a set of couplings, the set of couplings being user interface elements;
providing a group management interface by the computing device to the user, the group management interface enabling a user to toggle discovery on a group by group basis and to create new groups from the set of couplings by selecting each coupling to include in a group in the group management interface, where each group is defined specific to the user of the computing device and a toggle for discovery of the individual in a group is independent of discovery of the group, each coupling in a group having a discoverability toggle that is independently changeable from other couplings in a group and independently changeable from group discoverability, where the discoverability toggle for each coupling and each group is presented through the group management interface, the group management interface enables building groups out of previously defined groups;
providing an interface by the computing device to enable the user to reset the avatar;
sending discoverability settings for the user to a server;
receiving additional communication information from the individual;
updating the representation of the individual through the map interface to include the additional communication information;
executing a first location service of the computing device to determine a location of the computing device, the first location service having a highest level of accuracy of available location services for the computing device;
changing automatically to a second location service of the computing device to determine the location of the computing device, the second location service having lower power requirements than the first location service to conserve battery life;
changing back to the first location service of the computing device from the second location service in response to a location services event, where the locations services event can be any one of a movement of the computing device a defined distance, a change in a rate of movement of the computing device, a user input, or expiration of a defined time range; and
returning automatically to the second location service of the computing device from the first location service after a pre-defined duration to conserve battery life,
messaging the individual to confirm and create couplings and groups;
detecting group similarities between groups defined by different users;
executing a cloaked mode that provides blurred location information instead of accurate information to other users;
automatically identifying equidistant meeting points between users that is based on mode of travel for each user and a preferred type of meeting location for each user;
executing a matching service using a user profile, questionnaire data, or interest group membership that is filtered through discoverability settings; and
creating a group message by receiving selection of multiple avatars in quick succession by a rapid tap on a map interface, which can be saved and shared as a new group.

2. The computer-implemented method of claim 1, further comprising:
sending group membership data to the server to obtain proximate group member information.

3. A non-transitory computer-readable medium containing data and instructions to cause a programmable processor to perform operations comprising:
sending location information of a user to a server;
receiving notification information including a location of an individual and communication information from the individual, wherein receiving the notification information is for individuals in proximity to the user;
mapping the location of the individual using a representation of the individual in the form of an avatar sent by the individual, the representation integrated with the communication information from the individual;
receiving a user selection of a representation of the individual through a map interface of a computing device;
providing a communication interface by the computing device to the user in response to the user selection;
transmitting a communication by the computing device to the individual;
tracking mutually accepted discoverability as a coupling between the individual and the user in a set of couplings;
providing a group management interface by the computing device to the user, the group management interface enabling a user to toggle discovery on a group by group basis and to create new groups from the set of couplings by selecting each coupling to include in a group in the group management interface, where each group is defined specific to the user of the computing device and a toggle for discovery of the individual in a group is independent of discovery of the group, each coupling in a group having a discoverability toggle that is independently changeable from other couplings in a group and independently changeable from group discoverability, where the discoverability toggle for each coupling and each group is presented through the group management interface, the group management interface enables building groups out of previously defined groups;
providing an interface by the computing device to enable the user to reset the avatar;
sending discoverability settings for the user to a server;
receiving additional communication information from the individual;

updating the representation of the individual through the map interface to include the additional communication information;

executing a first location service of the computing device to determine a location of the computing device, the first location service having a highest level of accuracy of available location services for the computing device;

changing automatically to a second location service of the computing device to determine the location of the computing device, the second location service having lower power requirements than the first location service to conserve battery life;

changing back to the first location service of the computing device from the second location service in response to a location services event, where the locations services event can be any one of a movement of the computing device a defined distance, a change in a rate of movement of the computing device, a user input, or expiration of a defined time range; and returning automatically to the second location service of the computing device from the first location service after a pre-defined duration to conserve battery life, messaging the individual to confirm and create couplings and groups;

detecting group similarities between groups defined by different users;

executing a cloaked mode that provides blurred location information instead of accurate information to other users;

automatically identifying equidistant meeting points between users that is based on mode of travel for each user and a preferred type of meeting location for each user;

executing a matching service using a user profile, questionnaire data or interest group membership that is filtered through discoverability settings; and creating a group message by receiving selection of multiple avatars in quick succession by a rapid tap on a map interface, which can be saved and shared as a new group.

4. The non-transitory computer-readable medium of claim 3, further comprising:

sending group membership data to the server to obtain proximate group members.

* * * * *